United States Patent Office 3,652,631
Patented Mar. 28, 1972

3,652,631
O,O'-DIOL BISPEROXYCARBONATES
Henry C. Stevens, Akron, and Hans J. Wartmann, Wadsworth, Ohio, assignors to PPG Industries, Inc., Pittsburgh, Pa.
No Drawing. Continuation of application Ser. No. 458,449, May 24, 1965. This application Nov. 19, 1969, Ser. No. 871,691
Int. Cl. C07c 3/10; C08f 1/60
U.S. Cl. 260—453 R    7 Claims

ABSTRACT OF THE DISCLOSURE

Described are diesters of diols of poly(oxyalkylene) diols and two acid peroxyesters of a monohydric alcohol and carbonic acid wherein the carbonyl groups of the peroxyesters are esterified with the diol. These compounds are represented by the structure

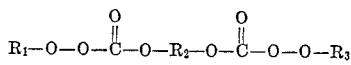

$R_1$ and $R_3$ are organic radicals having up to 10 carbon atoms and $R_2$ is the divalent radical of a diol.

Method of their preparations involve reaction of a bischloroformate of the diol with an organic hydroperoxide. These compounds and compositions thereof with an organic hydroperoxide and/or diperoxide are described. The compounds and compositions are useful for polymerizing olefinically unsaturated monomers.

---

This application is a continuation of U.S. application Ser. No. 458,449, filed May 24, 1965, now abandoned.

This invention relates to novel diester catalyst compounds and to their preparation and formulation into catalyst compositions. It further relates to their special usefulness as polymerization catalysts. In particular, it relates to peroxy derivatives of organic diols and hydroperoxides.

The herein contemplated compounds are represented by the structural formula:

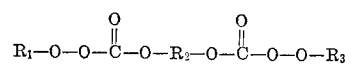

wherein $R_1$ and $R_3$ are organic radicals containing up to 10 carbon atoms each and including aliphatic, cycloaliphatic, and aromatic radicals and $R_2$ is a divalent residue of an organic diol including aliphatic, cycloaliphatic, aromatic, and alkylene or poly(oxyalkylene) diols. In the more useful catalyst compounds, either $R_1$ or $R_3$ or $R_1$ and $R_3$ are tertiaryalkyl groups such as tertiarybutyl and $R_2$ is a residue of an alkylene or poly(oxyalkylene) diol represented by the formula:

$$HO[(CH_2)_nO]_mH$$

wherein $n$ is a value of from 2 to 3 and $m$ is a value of from 1 to 4. Thus, these compounds are diesters of (a) a diol and (b) two acid peroxyesters of a monohydric alcohol and carbonic acid in which the carbonyl group of each of the two acid peroxyesters is esterified with the diol. These compounds may also be regarded as diperoxyesters of a bis(carbonic acid),

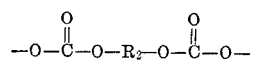

wherein $R_2$ is as hereinbefore defined. Identification of specific compounds may be by reference to nomenclature such as bis-peroxycarbonates and a specific name to a particular compound embodying this type of nomenclature may be given such as ethylene glycol-O,O'-bis(OO-tertiary-butyl peroxycarbonate) for the catalyst prepared by the reaction of ethylene glycol bis-chloroformate with tertiarybutyl hydroperoxide.

These diesters catalyze the polymerization or copolymerization of olefinically unsaturated monomers, especially monomers containing the unsaturated, polymerizable group, $CH_2=C<$. They may be employed as such to catalyze polymerizations or they may be formulated with organic diperoxides such as ditertiarybutyl peroxide or mixtures of organic diperoxides and hydroperoxides to provide notable catalyst compositions.

These diester compounds or compositions are catalytically active and readily initiate polymerizations of monomers such as vinyl chloride. With these catalysts polymerizations characterized by better reaction control are provided leading to polymers which are relatively free of cracks, bubbles, or other defects. These catalysts are also very efficient as polymerization initiators. For many polymerizations, concentrations as low as 0.1 weight percent or even lower basis the amount of monomer present are effective.

The diesters are prepared according to a preferred method by reacting one chemical equivalent of an organic diol bis-chloroformate, e.g. ethylene glycol-1,2-bis-chloroformate with two chemical equivalents of an organic hydroperoxide, e.g. tertiarybutyl hydroperoxide, in the presence of a hydrogen halide acceptor, e.g. an alkaline agent such as sodium hydroxide. The bis-chloroformates are readily prepared by the recognized method of reacting two chemical equivalents of phosgene per chemical equivalent of an organic diol. It is well to conduct the reaction from which diester is formed under conditions which minimize the opportunity for contamination especially with trace metals, such as by the use of a reactor which is inert to the peroxide. Trace metal impurities such as iron particles may accelerate or cause the decomposition of the product. Stainless steel and glass reactors are generally satisfactory for this purpose.

The thus prepared diester catalyst in addition to its use as the sole catalyst in a polymerization system may also be employed in a catalyst composition comprised of this thus prepared catalyst along with a diperoxide and/or hydroperoxide as mentioned hereinbefore. One usual method of arriving at a predetermined useful catalyst composition is by directly charging the reaction mixture in which the diester is prepared with selected organic diperoxide and/or excess hydroperoxide. Alternately, they may be added after the diester has been prepared. If a slight excess of the hydroperoxide is charged in the diester preparation, a product mixture containing some of the unreacted hydroperoxide, often from 0.5 to 4 percent by weight, can be directly provided. Where it is desirable to provide a catalyst composition which contains a diperoxide in addition to the prepared dester and unreacted hydroperoxide, it is convenient to first combine the hydroperoxide and diperoxide before the reaction to prepare the diester is begun and add this combination directly to the reaction mixture. When this is done, a useful composition containing from 70.0 to 98.0 percent by weight of the diester, from 1.0 to 20.0 percent by weight diperoxide, and from 0.5 to 4.0 percent by weight hydroperoxide results. One useful embodiment hereof involves a catalyst composition comprising from 80 to 96 percent by weight of the prepared diester, from 2 to 12 percent by weight of the diperoxide, and from 0.5 to 4 percent by weight of the hydroperoxide. Another useful composition which may be prepared in accordance with this invention contains from 65 to 99 percent by weight of the prepared diester and from 0.5 to 35 percent by weight hydroperoxide. When this practice is followed, it is advantageous that the composition's active oxygen compounds be comprised of organic groups which correspond to those of the diester. By way of example, a preferred catalyst composition comprises ditertiarybutyl peroxide, tertiarybutyl hydroperoxide and diol-O,O'-bis(OO-tertiarybutyl peroxycarbonate).

Organic diols (the bis-chloroformates of which are reacted with the hydroperoxides in the preparation of the contemplated diesters and which characterize the divalent residue $R_2$) are preferably those which contain up to 12 carbon atoms and 3 ether linkages. Diols containing from 2 to 8 carbon atoms are particularly useful. Diesters of aliphatic diols such as 1,2-propanediol, 1,3-propanediol, 1,4-butanediol, 2-butene-1,4-diol, 2-butyne-1,4-diol, 1,5-pentanediol, 1,6-hexanediol, 2,2-dimethyl-1,3-propanediol, 2,5-dimethylhexane-2,5-diol; of cycloaliphatic diols such as cyclohexane-1,4-diol; of aromatic diols such as p-phenyl-dimethanol, p-phenyldiethanol, Bisphenol A; and of poly(oxyalkylene) diols such as ethylene glycol, diethylene glycol, triethylene glycol, tetraethylene glycol, dipropylene glycol are contemplated. Other useful diols include thioether diols such as thioglycol and thiodipropanol and aliphatic diols containing inert substituents such as halo and nitro groups. Polyols may also be used. Preferred diols are the poly(oxyalkylene) diols which are described by a representative structural formula hereinbefore; however, polyether diols containing more than 3 ether linkages and 3 carbon atoms per linkage may also be employed.

The hydroperoxides which are condensed with the organic diol bis-chloroformates to form the contemplated diesters and from which radicals $R_1$ and $R_3$ are provided, contain up to 10 carbon atoms. Usually the hydroperoxides contain at least 4 carbon atoms. Tertiaryalkyl hydroperoxides, i.e. tertiarybutyl, tertiaryamyl, and tertiaryhexyl hydroperoxides are preferred. Useful aliphatic and cycloaliphatic hydroperoxides include ethyl, isopropyl, cyclohexyl, 1-methyl-1-cyclohexyl, methylcyclopentyl, 2-cyclohexylisopropyl, cyclohexenyl, methylcyclohexenyl, methylcyclopentenyl, decalinyl, and pinanyl hydroperoxides. Among the useful aromatic hydroperoxides which fall within the scope of the instant invention are α,α-dimethylbenzyl (cumyl), p-methyl-α,α-dimethylbenzyl (cymyl), p-methylbenzyl, α-phenylethyl, tetralinyl, and α,α-diphenylethyl hydroperoxides. These enumerated organic hydroperoxides as well as others which may be conceived by one skilled in the art may also contain certain substituents such as halo and nitro substituents on the organic group.

The hydrogen halide acceptor utilized in the reaction for the diester formation is preferably an aqueous solution of a strong alkali metal hydroxide, viz sodium hydroxide and potassium hydroxide. The alkaline earth metal hydroxides such as calcium hydroxide may be employed as well as alkali and alkaline earth oxides such as sodium oxide and magnesium oxide and organic bases such as pyridine and N,N-dimethylaniline. Sodium hydroxide is preferred.

In performing the reaction by which the diesters are prepared with or without added diperoxide and excess hydroperoxide, the reactants are cooled to below 25° C., preferably 10° C. or less, but rarely below the freezing temperature of the reaction mixture (usually about −10° C.). Thus, temperatures from about −10° C. to about 25° C. are preferable. Temperatures within this range readily insure the establishment and maintenance of a liquid reaction medium. Higher temperatures (e.g. 40° C. or higher) while operative are not usually recommended since they may result in product losses from decomposition during the reaction.

To the cooled reactants, the alkaline agent is added as a 25 percent by weight aqueous solution. Large excesses of alkaline agent may be employed but because they tend to cause undesirable hydrolysis of the bis-chloroformate are better avoided. Thus, from 1 to 3 percent excess alkaline agent is recommended. Aqueous solutions containing from about 10 to 40 percent by weight alkali metal hydroxide may be employed; however, a 25 percent by weight alkali metal hydroxide aqueous solution is preferred because among reasons the resultant brine solution after reaction readily separates and is easily withdrawn. The addition of alkaline agent solution is done gradually with stirring to permit heat control. No difficulty is encountered with an addition period of about 1 hour. Other rates of addition may be employed so long as they permit the reaction temperature to be held below the maximum preferred temperature, e.g. about 25° C.

The reaction is relatively rapid but because two phases are present in the system it is advantageous to allow an extra reaction time of about one-half hour so that the bis-chloroformate is completely consumed. After the reaction is complete, the organic layer is separated from the aqueous, immiscible layer and the product is washed with water and recovered. The specific details employed in the practice of this invention will be readily apparent in the hereinafter provided examples.

One group of compounds which contain the unsaturated, polymerizable

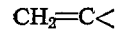

group are readily polymerized by the herein contemplated peroxy catalysts and/or compositions. Most of the unsaturated compounds of this type contain one or more activating groups which are linked directly to the unsaturated group. Typical of those linked groups which appear to activate polymerization are

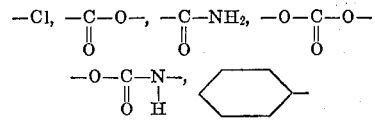

The novel catalysts or catalyst compositions described herein may be used to polymerize many monomers in solution such as vinyl acetate, styrene, methyl methacrylate, vinylidene chloride, etc. In emulsion and suspension polymerizations many vinyl compounds, i.e. containing the

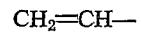

group, are readily polymerized. These diesters are capable of readily catalyzing the polymerization of monomers which many other peroxygen compounds do not catalyze such as vinyl fluoride. Other monomers which may be polymerized by the utilization of the novel catalysts and catalyst compositions presented herein are: acrylamide, acrylonitrile, styrene, halostyrenes, vinyl chloride, vinylidene chloride, vinyl bromide, vinyl acetate, vinyl formate, vinyl propionate, vinyl methyl ketone, divinyl ether, methyl acrylate, methyl methacrylate, ethyl acrylate, ethyl methacrylate and other acrylate esters, methacrylonitrile, methacrylamide, N-substituted methacrylamides, maleimide, etc. Many useful combinations of these monomers may be employed in accordance with the instant invention in copolymer systems for example, copolymers or interpolymers of acrylonitrile and styrene.

The following specific examples illustrate the manner by which the invention may be practiced.

EXAMPLE I

To a one-liter reaction flask equipped with an agitator and cooling jacket for brine circulation are added 45 grams ethylene glycol bis-chloroformate and 45 grams tertiarybutyl hydroperoxide. These ingredients are cooled to about −5° C. by brine circulation in the cooling jacket. The mixture is agitated for two hours during which time 22 grams of sodium hydroxide in a 25 percent by weight sodium hydroxide aqueous solution are added at a rate regulated to maintain relatively constant temperature control. The agitation is continued for another hour. The aqueous layer (in which by-product sodium chloride is dissolved) is allowed to settle and the oil, organic layer is separated and washed 5 times with equal volume portions of water. The washed organic layer is next filtered and dried with anhydrous sodium sulfate. The final dried product weighs 53 grams and contains 93 percent by weight ethylene glycol-O,O'-bis(OO-tertiarybutyl peroxycarbonate and 3 percent by weight tertiarybutyl hydroperoxide.

Further washings of the product with a 5 percent by weight sodium hydroxide solution, a water portion, a dilute sulfuric acid solution, and 3 additional water portions with subsequent anhydrous sodium carbonate drying results in essentially pure ethylene glycol-O,O'-bis-(OO-tertiarybutyl peroxycarbonate).

EXAMPLE II

A 0.05 gram sample of each of the two products prepared as in Example I is added to 100 grams each of styrene monomer and methyl methacrylate monomer. Fifty grams of water are added to the styrene and ethylene glycol - O,O' - bis(OO-tertiarybutyl peroxycarbonate) system. The mixtures are heated to about 80° C .and then are removed from the heating bath. After the temperature has subsided, the mixtures are dried in an oven for 2 hours. On cooling, clear polymers result in each case.

EXAMPLE III

Following the procedure of Example II, a copolymer of acrylonitrile and vinylidene chloride is prepared using the washed and dried product from the reaction of ethylene glycol bis-chloroformate and tertiarybutyl hydroperoxide.

EXAMPLE IV

The procedure of Example I is followed except that a tertiarybutyl hydroperoxide - ditertiarybutyl peroxide mixture containing about 75 percent by weight of the hydroperoxide an about 25 percent by weight of the diperoxide is substituted for the tertiarybutyl hydroperoxide. The final filtered product weighs 60 grams and contains 91.5 percent by weight ethylene glycol-O,O'-bis-(OO - tertiarybutyl peroxycarbonate), 7.0 percent by weight ditertiarybutyl peroxide, and 1.0 percent by weight tertiarybutyl hydroperoxide.

EXAMPLE V

A sample of the catalyst composition prepared by the method of Example IV is added to 50 grams of vinyl chloride forming a solution of catalyst in monomer. This solution is added to an aqueous solution of 4 grams sodium alkylbenzenesulfonate in 150 grams of water contained in a polymerization reaction flask. After maintaining the mixture for 6 hours at 60° C. with adequate agitation, a polymer is recovered in a substantially complete yield.

EXAMPLE VI

One chemical equivalent of diethylene glycol bis-chloroformate is reacted with 2 chemical equivalents of tertiarybutyl hydroperoxide under the conditions as given in Example I producing the catalyst product diethylene glycol - O,O' - bis(O,O-tertiarybutyl peroxycarbonate) in about a 99 percent yield.

EXAMPLE VII 1,6-hexanediol is reacted with excess phosgene producing 1,6 - hexanediol - bis - chloroformate which is subsequently reacted with 2 chemical equivalents of tertiaryhexyl hydroperoxide producing a catalyst composition comprising 98 perecnt by weight 1,6-hexanediol-O,O'-bis-(OO-tertiaryhexyl peroxycarbonate) and 2 percent tertiaryhexyl hydroperoxide by weight.

EXAMPLE VIII

Following the procedure of Example I, 10 grams of sodium hydroxide in 100 grams of water are gradually added within 2 hours to a mixture of 54 grams of the bis-chloroformate of cyclohexane-1,4-dimethanol and 53 grams of 1-methyl-1-cyclohexyl hydroperoxide such that the temperature remains at about 10° C. The final yield is 76 percent of 1,4-cyclohexanedimethanol-O,O'-bis(OO-1-methyl-1-cyclohexyl peroxycarbonate).

The diesters prepared in accordance with this invention effectively catalyze bulk and solution polymerization and copolymerization. They are also effective for emulsion and suspension polymerization and copolymerization. They are also useful as bleaching agents. They may be used to bleach materials which are sensitive to alkaline peroxides without danger of excessive fabric degradation. These catalysts may also be used in crosslinking polyethylene and ethylene-propylene polymer as well as rubber compositions with and without sulfur. Silicon rubbers may also be readily crosslinked with the diester catalysts contemplated herein.

Alternately, the diesters may be prepared by forming a chloroformate of the organic hydroperoxide and reacting 2 molar equivalents of this organic oxychloroformate in turn with 1 molar equivalent of the organic diol.

Another method which may be employed to produce these compounds is to carry out the condensation reaction of the organic diol bis-chloroformate with the organic hydroperoxide in an organic base solvent medium. By way of example, the condensation reaction may be carried out in a liquid medium comprised of N,N-dimethylaniline which compound serves as both a solvent medium and also as a hydrogen halide acceptor so that the reaction is readily performed in one phase. Other normally liquid (at the reaction temperature employed) organic bases such as pyridine may be readily utilized for this dual function in the condensation reaction from which the catalysts of the instant invention are prepared.

The organic reactants may be conveniently added as a solution, if desired, using organic solvents such as aromatic, e.g. benzene and chlorobenzene; aliphatic, e.g. n-hexane; and chlorinated, e.g. methylene chloride and chloroform which function as solvents for both reactants and subsequently produced product. The diester product will then be solvated in this organic phase and easily separated from the aqueous phase as a solution upon reaction completion. This method is very convenient for commercial production of compounds since they can be handled more easily while in solution and, if so desired, the solvent can be easily removed by distillation leaving the catalyst compound and/or composition to be used thusly.

By the procedure of this invention cyclic or polymeric esters may be prepared. In this embodiment, one chemical equivalent of a bis-chloroformate of a selected organic diol reacted with one chemical equivalent of a selected organic bis-hydroperoxide in the presence of an alkaline agent will produce the corresponding cyclic ester. By way of example, one mole of the bis-chloroformate of 2,5-dimethylhexane-2,5-diol condensed with one mole of 2,5-dimethylhexane-2,5-dihydroperoxide in the presence of an alkaline agent, such as sodium hydroxide, will result in a product characteristic of the corresponding cyclic ester. If, instead of forming a cycle, the reactants form a linear chain incorporating alternating groups, a polyester may be formed which is polymeric in nature.

Although the invention has been described with respect to certain specific embodiments it is not intended that the invention be construed as limited thereto except insofar as should be determined by the scope of the appended claims.

We claim:
1. A diester of the formula:

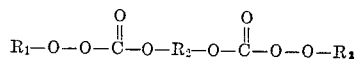

wherein $R_1$ and $R_3$ are derived from a monohydric alcohol having up to 10 carbon atoms selected from the group consisting of alcohols containing only carbon, hydrogen and oxygen atoms and alcohols containing substituents selected from halo and nitro substituents and $R_2$ is the divalent residue of an organic diol containing up to 12 carbon atoms and up to three ether linkages selected from the group consisting of: unsubstituted aliphatic, cycloalkyl, aromatic, alkylene, poly(oxyalkylene) diols containing only carbon, hydrogen and oxygen atoms; aliphatic thioether diols; and aliphatic diols containing inert substituents selected from the group consisting of halo and nitro groups.

2. A diester of the formula:

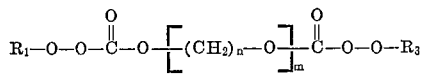

wherein $R_1$ and $R_3$ are derived from a monohydric alcohol containing up to 10 carbon atoms and only carbon, hydrogen and oxygen atoms and $n$ is a value of from 2 to 3 and $m$ is a value of 1 to 4.

3. The diester of claim 1 wherein $R_1$ and $R_3$ are derived from a tertiary alcohol containing at least four carbon atoms.

4. The diester of claim 1 wherein the $R_1$ and $R_3$ are organic radicals containing only carbon, hydrogen and oxygen atoms.

5. A diester of the formula:

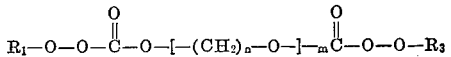

wherein $R_1$ and $R_3$ are derived from a tertiary alcohol selected from the group consisting of tertiary butyl, amyl and hexyl alcohols.

6. Ethylene glycol-O,O'-bis(OO-tertiarybutyl peroxycarbonate).

7. Diethylene glycol-O,O'-bis(OO-tertiarybutyl peroxycarbonate).

References Cited
UNITED STATES PATENTS 3,225,079  12/1965  Harrison et al. _____ 260—463

LEWIS GOTTS, Primary Examiner

D. G. RIVERS, Assistant Examiner

U.S. Cl. X.R.

8—111; 260—80 C, 85.5 F, 85.5 XA, 88.3 R, 88.7 D, 89.1, 89.5 AW, 89.7 R, 91.5, 92. 1, 92.8 W, 93.5 W, 94.9 GA